(12) United States Patent
Hebert

(10) Patent No.: US 6,857,285 B2
(45) Date of Patent: Feb. 22, 2005

(54) BUILDING EXHAUST AND AIR CONDITIONER CONDENSATE (AND/OR OTHER WATER SOURCE) EVAPORATIVE REFRIGERANT SUBCOOL/PRECOOL SYSTEM AND METHOD THEREFOR

(75) Inventor: Thomas H. Hebert, Lutz, FL (US)

(73) Assignee: Global Energy Group, Inc., Odessa, FL (US)

( * ) Notice: Subject to any disclaimer, the term of this patent is extended or adjusted under 35 U.S.C. 154(b) by 0 days.

(21) Appl. No.: 10/713,768

(22) Filed: Nov. 13, 2003

(65) Prior Publication Data

US 2004/0144118 A1 Jul. 29, 2004

Related U.S. Application Data

(63) Continuation of application No. 10/031,275, filed as application No. PCT/US99/23394 on Oct. 7, 1999, now abandoned, which is a continuation-in-part of application No. 09/168,822, filed on Oct. 8, 1998, now Pat. No. 6,070,423.

(51) Int. Cl.[7] .............................................. F28D 5/00
(52) U.S. Cl. ............................. 62/305; 62/91; 62/280
(58) Field of Search .............................. 62/71, 79, 91, 62/277, 278, 279, 280, 305

(56) References Cited

U.S. PATENT DOCUMENTS

| | | |
|---|---|---|
| 1,891,538 A | 12/1932 | Hicks |
| 2,124,291 A | 7/1938 | Fleisher |
| 2,255,585 A | 9/1941 | Hubacker |
| 2,350,408 A | 6/1944 | McGrath |
| 2,351,695 A | 6/1944 | Newton |
| 2,776,543 A | 1/1957 | Ellenberger |
| 2,801,524 A | 8/1957 | Fifield |
| 2,938,361 A | 5/1960 | McNatt |
| 3,264,839 A | 8/1966 | Harnish |
| 3,537,274 A | 11/1970 | Tilney |
| 3,902,551 A | 9/1975 | Lim et al. |
| 4,023,949 A * | 5/1977 | Schlom et al. ................ 62/309 |
| 4,320,629 A | 3/1982 | Nakagawa et al. |
| 4,373,346 A * | 2/1983 | Hebert et al. .................. 62/79 |
| 4,375,753 A | 3/1983 | Imasu et al. |
| 4,380,910 A * | 4/1983 | Hood et al. .................... 62/91 |

(List continued on next page.)

FOREIGN PATENT DOCUMENTS

| | | |
|---|---|---|
| EP | 559983 | 9/1983 |
| GB | 2056652 | 3/1981 |

OTHER PUBLICATIONS

U.S. patent application Ser. No. 09/058,632, Herbert, filed Apr. 10, 1998.

(List continued on next page.)

Primary Examiner—Melvin Jones
(74) Attorney, Agent, or Firm—Holland & Knight LLP

(57) ABSTRACT

A system for providing liquid refrigerant subcooling, by means of evaporative cooling utilizing the condensate water of said air conditioner, refrigeration/heat pump system and/or some other water supply to wet the surface of the subcool heat exchanger and pass the dry exhaust air across the wetted surface of the subcool heat exchanger. A system for providing hot gas discharge refrigerant precooling into the primary condenser of an air conditioner, refrigeration or heat pump system by evaporative cooling utilizing the condensate water of said system and/or other water supply to wet the surface of the precool heat exchanger and then passing the cold, dry exhaust air across the wetted surface of the precool heat exchanger. A combination subcooler/precooler system where the cold dry building exhaust air is used to evaporatively subcool the liquid refrigerant in the water wetted (or dry) subcooler and then used to conductively cool the hot gas refrigerant.

25 Claims, 11 Drawing Sheets

U.S. PATENT DOCUMENTS

| | | |
|---|---|---|
| 4,542,786 A | 9/1985 | Anders |
| 4,574,868 A | 3/1986 | Anders |
| 4,599,870 A | 7/1986 | Hebert |
| 4,679,404 A | 7/1987 | Alsenz |
| 4,873,837 A | 10/1989 | Murray |
| 4,910,972 A | 3/1990 | Jaster |
| 5,205,347 A | 4/1993 | Hughes |
| 5,275,232 A | 1/1994 | Adkins et al. |
| 5,345,778 A | 9/1994 | Roberts |
| 5,465,591 A | 11/1995 | Cur et al. |
| 5,485,732 A | 1/1996 | Locatelli |
| 5,613,554 A | 3/1997 | Bull et al. |

OTHER PUBLICATIONS

U.S. patent application Ser. No. 09/058,612, Hebert, filed Apr. 10, 1998.

U.S. patent application Ser. No. 09/167,429, Hebert, filed Oct. 6, 1998.

U.S. patent application Ser. No. 09/168,815, Hebert, filed Oct. 6, 1998.

U.S. patent application Ser. No. 08/802,398, Hebert, filed Feb. 18, 1997.

* cited by examiner

BUILDING EXHAUST AND AIR CONDITIONER CONDENSATE (AND/OR OTHER WATER SOURCE) EVAPORATIVE REFRIGERANT SUBCOOL/PRECOOL SYSTEM AND METHOD THEREFOR

CROSS-REFERENCE TO RELATED APPLICATIONS

The present invention is a continuation of application Ser. No. 10/031,275 filed Nov. 7, 2001, ABN which is a 371 application of PCT/US99/23394 filed Oct. 7, 1999, which is a continuation-in-part of application Ser. No. 09/168,822, filed Oct. 8, 1998, now U.S. Pat. No. 6,070,423, the disclosures of which are hereby incorporated by reference herein.

BACKGROUND OF THE INVENTION

1. Field of the Invention

The present invention relates to a subcool and/or precool system for the liquid refrigerant and/or hot gas discharge refrigerant of an air conditioning, refrigeration or heat pump system (cooling mode) that utilizes either the exhaust air required for clean air operation of a building's conditioned air supply only, or the exhaust air and the condensate discharge from said air conditioning, refrigeration or heat pump system (or other water source), or outside air and said condensate (or other water source) to accomplish said subcooling and/or precooling for purposes of increasing the capacity and efficiency of said air conditioning, refrigeration or heat pump system.

The present invention further relates to a system for ducting the building exhaust air or outdoor air to said subcool and/or precool system. Said building exhaust air to be used after a preliminary sensible heat exchange with the required incoming make up air if possible.

The present invention also relates to a system for piping the condensate of said air conditioner and/or heat pump system (or other water source) to the subcooling and/or precooling heat exchangers.

Also, the present invention additionally relates to a water sump and pump system or capillary feed system for continually wetting the subcool and/or precool heat exchangers with the condensate (or other water source) while the exhaust air or outside air is blowing across the wetted subcool and/or precool heat exchangers for purposes of evaporatively subcooling and/or precooling the refrigerant.

This invention more particularly pertains to an apparatus and method comprising a building exhaust air or outdoor air supply and air conditioner condensate (or other water source) evaporative subcooler where said subcooler is serially located between the air conditioning, refrigeration or heat pump systems' condenser and its evaporator. This invention also more particularly pertains to an apparatus and method comprising a building exhaust air and air conditioning condensate (or other water source) evaporative precooler where said precooler is positioned serially between the air conditioning, refrigeration or heat pump system compressor and its condenser.

Next, this invention also more particularly pertains to an apparatus and method whereby said building exhaust air or outdoor air and air conditioner condensate (or other water source) may be first used to evaporatively subcool the liquid refrigerant and then the exhaust air and water are subsequently used to evaporatively precool the hot gas discharge refrigerant.

Further, this invention also more particularly pertains to an apparatus and method whereby said building exhaust air or outdoor air and air conditioner, refrigeration or heat pump condensate (or other water) may be first used to evaporatively subcool the liquid refrigerant and then the exhaust air discharge from the subcooler only, being used to conductively precool the hot gas discharge refrigerant.

Additionally, this invention more particularly pertains to an apparatus and method comprising a duct system that directly feeds the building exhaust air or outdoor air through said wetted subcooler and/or precooler or that feeds said building exhaust air, after sensible heat exchange with incoming make up air, to said wetted subcooler and/or precooler.

This invention also more particularly pertains to an apparatus and method for directing the condensate of an air conditioning, refrigeration or heat pump system to said subcooler and/or precooler. If condensate is not adequate or not available, another water source with a float control to keep the water level where needed can be directed to said subcooler and/or precooler.

This invention also more particularly pertains to an apparatus and method comprising either a pump and distribution system for keeping the subcooler and/or precooler heat exchanger surfaces wetted or a capillary system for accomplishing same.

Where the primary system is a heat pump, operating in the heating mode, another function of the present invention would be to utilize the building exhaust air or outdoor air only to first subcool the liquid refrigerant and then reuse the air supply after absorbing the heat from the subcooler to add heat to the postheater(precooler in the cooling mode). This is made possible by locating the precooler/postheater heat exchanger in the heat pump circuit serially between the reversing valve and the outdoor coil.

Additionally, this invention also relates to an apparatus and method where relatively cool building exhaust air only is used only to subcool the liquid refrigerant.

Next, this invention also relates to an apparatus and method where relatively cool building exhaust air only is used only to desuperheat the hot gas refrigerant.

Also, this invention relates to an apparatus and method where relatively cool building exhaust air only is first used to subcool the liquid refrigerant and then is reused to desuperheat the hot gas refrigerant.

Finally, this invention relates to an apparatus and method where relatively warm building exhaust air only is first used to postheat the evaporating refrigerant after the primary outdoor evaporator of a heat pump, operating in the heating mode.

2. Description of the Background Art

Presently there exist many types of devices designed to operate in the thermal transfer cycle. The vapor-compression refrigeration cycle is the pattern cycle for the great majority of commercially available refrigeration systems. This thermal transfer cycle is customarily accomplished by a compressor, condenser, throttling device and evaporator connected in serial fluid communication with one another. The system is charged with refrigerant, which circulates through each of the components. More particularly, the refrigerant of the system circulates through each of the components to remove heat from the evaporator and transfer heat to the condenser. The compressor compresses the refrigerant from a low-pressure superheated vapor state to a high-pressure superheated vapor state thereby increasing the temperature, enthalpy and pressure of the refrigerant. A superheated vapor is a vapor that has been heated above its boiling point temperature. It leaves the compressor and enters the condenser as a vapor at some elevated pressure where the refrigerant is condensed as a result of the heat transfer to cooling water and/or to ambient air. The refrigerant then flows through the condenser condensing the refrigerant at a substantially constant pressure to a saturated-liquid state. The refrigerant then leaves the condenser as a high pressure liquid. The pressure of the liquid is decreased as it flows through the expansion valve causing the refrigerant to change to a mixed liquid-vapor state. The remaining liquid, now at low pressure, is vaporized in the evaporator as a result of heat transfer from the refrigerated space. This vapor then enters the compressor to complete the cycle. The ideal cycle and hardware schematic for vapor compression refrigeration is shown in FIG. 1 as cycle 1-2-3-4-1. More particularly, the process representation in FIG. 1 is represented by a pressure-enthalpy diagram, which illustrates the particular thermodynamic characteristics of a typical refrigerant. The P-h plane is particularly useful in showing the amounts of energy transfer as heat. Referring to FIG. 1, saturated vapor at low pressure enters the compressor and undergoes a reversible adiabatic compression, 1-2. Adiabatic refers to any change in which there is no gain or loss of heat. Heat is then rejected at constant pressure in process 2-3. An adiabatic pressure change occurs through the expansion device in process 3-4, and the working fluid is then evaporated at constant pressure, process 4-1, to complete the cycle. However, the actual refrigeration cycle may deviate from the ideal cycle primarily because of pressure drops associated with fluid flow and heat transfer to or from the surroundings. It is readily apparent that the temperature of the liquid refrigerant plays an important role in the potential for removing heat in the evaporator phase of the thermal cycle. The colder the liquid refrigerant entering the evaporator, the greater the possible change in enthalpy or heat energy absorbed per unit mass of liquid available for vaporization and the colder the liquid refrigerant entering the expansion device leading to the evaporator, the lower the flash gas loss, which means a higher portion or percentage of mass is available for vaporization through the evaporator.

Also, it is readily apparent that rapid precooling of the hot gas discharge from a compressor lowers compressor power consumption, improves compressor efficiency and improves the primary condenser's performance. It is also readily apparent that adding more heat to the evaporator (postheater) of a heat pump in the heating mode improves the systems' coefficient of performance. Many such devices and methods currently exist that are designed to accomplish this subcooling and precooling or postheating.

However, these known methods and devices have drawbacks. The drawbacks include the high cost of accomplishing the subcooling and/or precooling and/or postheating, and/or the ineffectiveness or degrading effectiveness of the subcooling and/or precooling and/or posting method and/or device.

In response to the realized inadequacies of earlier methods and devices, and because of the recently mandated indoor clean air act that requires a certain percentage of indoor air to continually be replaced, it became clear that there was a need for a liquid refrigerant subcooler for an air conditioning or heat pump system that has a low initial cost as well as having a method for utilizing the relatively cold, dry air that is exhausted from a building air supply for purposes of maintaining good indoor air quality as well as for alternatively also utilizing the condensate from said air conditioning or heat pump (or other water source) to accomplish said subcooling conductively or evaporatively, or to use the condensate and alternatively the outdoor air to subcool evaporatively.

It is also readily apparent that rapid precooling of the hot gas discharge from a compressor reduces head pressure, decreases power consumption, increases refrigerant mass flow and improves the efficiency of an air conditioner, refrigeration or heat pump system.

The use of the relatively cold, dry exhaust air only, or with the use of the exhaust air or alternatively with the use of outdoor air and the use of the condensate (or other water source) directly or even after the exhaust air only or exhaust air and condensate being first used to subcool the liquid refrigerant or alternatively after outdoor air and condensate being first used to subcool the liquid refrigerant, will provide this precooling in a very cost effective manner.

The building exhaust air is warm relative to outside air when heating is required by a heat pump, therefore another objective of the present invention is to reclaim the heat in the exhaust air by using this exhaust air to first reclaim heat from the subcooler then subsequently provide additional heat to a secondary evaporator, a postheater (precooler in the cooling mode), or alternatively to use the exhaust air without first subcooling to postheat the refrigerant when a heat pump is operating in the heating mode.

Therefore, the principal objective of this invention is to provide an improvement which overcomes the aforementioned inadequacies of the prior art devices and provides improvements which are a significant contribution to the advancement of the subcooler and/or precooler and/or postheater art for air conditioner, refrigeration or heat pump systems.

Another objective of the present invention is to provide a more constant subcooling over a wide range of air source or water source condenser conditions.

Still another objective of the present invention is to provide a conductive or evaporative cooling to the liquid refrigerant of an air conditioning, refrigeration or heat pump system.

Yet another objective of the present invention is to provide increased cooling capacity by means of the subcooling of the liquid refrigerant.

Still yet another objective of the present invention is to provide rapid precooling of the hot gas refrigerant discharge from a compressor by utilizing the relatively cold, dry building exhaust air only or exhaust air and condensate or alternatively outdoor air and condensate (or other water source) directly to provide a conductive or an evaporative cooling process that will provide for precooling of the hot gas refrigerant or even after both exhaust air only or exhaust air and water or alternatively outdoor air and water being first used to conductively or evaporatively subcool the liquid refrigerant.

Yet a further objective of the present invention is to provide an alternate means for precooling the hot gas refrigerant after first conductively or evaporatively subcooling the liquid refrigerant with the building exhaust air only or with the exhaust air and water or alternatively with outdoor air and water, whereby the exhaust air exiting the subcooler is used only, to conductively cool the precool heat exchanger, which in turn precools the hot gas refrigerant passing through the precooler.

Still another objective of the present invention is to provide higher efficiency in the heating mode of a heat pump by utilizing the relatively warm building exhaust air to provide additional heat to the evaporating refrigerant in a secondary evaporator, a postheater, located serially between the primary evaporator and the reversing valve that functions as a precooler in the cooling mode of the heat pump.

Yet still another objective of the present invention is to first use the building exhaust air to subcool the liquid refrigerant in a subcooler, which adds more heat to the exhaust air, before subsequently passing the subcooler heated building exhaust air through the postheater and adding even more heat to the evaporating refrigerant.

And yet another objective of the present invention is to provide lower power consumption and increased pumping efficiency of the compressor, as well as to improve the primary condenser's performance.

Even yet another objective of the present invention is to provide a means for ducting and supplying the building exhaust air or alternatively outdoor air to the subcool and/or precool and/or postheat heat exchangers.

Yet a further objective of the present invention is to provide a means for capturing and directing the condensate of an air conditioning, refrigeration or heat pump system to the subcool and/or precool heat exchangers.

And yet another objective of the present invention is to provide a means for providing water directly to said subcool and/or precool heat exchangers if condensate is not available or is not adequate.

Yet a further objective of the present invention is to provide a means for mechanical pumping or passive capillary pumping of said condensate or other water to said subcooler and/or precooler heat exchangers to keep said subcooler and/or precooler heat exchangers wetted.

The foregoing has outlined some of the pertinent objects of the invention. These objects should be construed to be merely illustrations of some of the more prominent features and applications of the intended invention. Many other beneficial results can be obtained by applying the disclosed invention in a different manner or by modifying the invention within the scope of the disclosure.

Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. The present invention is directed to a first apparatus that satisfies the need for increased refrigeration effect by means of increased liquid refrigerant subcooling accomplished conductively, or alternatively evaporatively by utilizing the exhaust air required for clean air operation of a building's air supply only or alternatively with building exhaust air or outdoor air and the condensate of said air conditioning, refrigeration or heat pump system and/or other water supply. For the purpose of summarizing this first apparatus and means of the invention, the liquid refrigerant line coming off of an air or water source condenser of an air conditioner or heat pump is serially connected to an air to refrigerant subcool heat exchanger before being connected to the line leading to the expansion device of an air conditioning, refrigeration or heat pump system. The cold, dry exhaust air from a building's air supply being directed across said subcool heat exchanger or alternatively the building exhaust air or outdoor air being directed across said subcool heat exchanger that is being kept wet by consensate or other water.

Simply, this first apparatus allows conductive or alternatively evaporative subcooling of the liquid refrigerant by means of the cold, dry building exhaust air only or alternatively by means of the building exhaust air or outdoor air and by means of evaporating the condensate (or other) water from the wetted surface of the subcool heat exchanger, which subcools the refrigerant conductively or alternatively which reduces the temperature of the remaining water and the surface of the subcool heat exchanger to the wet bulb temperature of the building exhaust air which in turn subcools the liquid refrigerant inside the tubes of the subcool heat exchanger. Both the building exhaust air and/or the condensate water can be provided by the air conditioning, refrigeration or heat pump system needing the additional refrigeration effect caused by the refrigerant subcooling.

Moreover, this present invention may be configured by means of a second apparatus that satisfies the need for lower power consumption, increased pumping efficiency of the compressor, as well as improving the primary condensers performance by means of increased hot gas refrigerant precooling accomplished by utilizing the cold, dry exhaust air required for clean air operation of a building's air supply only or alternatively using the building exhaust air or outdoor air supply and the air conditioning or heat pump systems condensate (or other) water supply to accomplish this precooling conductively or alternatively evaporatively or after first use in the subcooler of the first apparatus. Another alternative would be to precool the hot gas conductively with the cooler and higher humidity air being discharged from the evaporatively cooled subcooler.

For the purposes of summarizing this second apparatus and means of the invention, the hot gas discharge line coming off of the compressor of an air conditioner, refrigeration or heat pump system is serially connected to an air to refrigerant precool heat exchanger before being connected serially to the hot gas line leading to the condenser. The cold, dry building exhaust air or alternatively outdoor air being directed (or after first being directed through the subcooler of the first apparatus) through said condensate (or other water supply) wetted precool heat exchanger or as an alternate, through a dry, precool heat exchanger.

Simply, this second apparatus allows evaporative (or conductive) precooling of the hot gas refrigerant by means of the cold, dry building exhaust air or outdoor air and condensate (or other) water or by means of the discharge of the air and water from the subcooler of the first apparatus where the cold, dry building exhaust air or outdoor air and condensate (or other) water is first used to subcool the liquid refrigerant and then used subsequently to precool the hot gas refrigerant.

Finally, this present invention may be configured for use in a heat pump operating in the heating mode where the precooler becomes a postheater, (both the same heat exchanger but changing functions) serially connected between the reversing valve and the outdoor or primary evaporator coil of the heat pump system. Simply, the second apparatus, the postheater (precooler in the cooling mode) allows conductive heating of the evaporating refrigerant after the refrigerant first passes through the primary evaporator by means of the heat in the building exhaust air directly or after said building exhaust air picked up additional heat from the subcooler before subsequently adding heat to the postheater.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which.

DETAILED DESCRIPTION OF THE PREFERRED EMBODIMENT

With reference to the drawings, and in particular to FIGS. 2, 2a, 2b, 3, 3a, 3b, 4, 4a, 4b, 5, 5a, 5b, 6, 6a, 7 and 8 thereof, new and improved subcooling, and/or precooling and/or postheating devices for improved air conditioning(or heating) capacity and/or increased efficiency, lower power consumption and improved primary condenser (or evaporator) performance, embodying the principles and concepts of the present invention and generally designated by the reference number (10) for the subcooler only, and generally designated by the reference number (11) for the precooler only and generally designated by the reference number (12) for the postheater only will be described.

Figure 1:
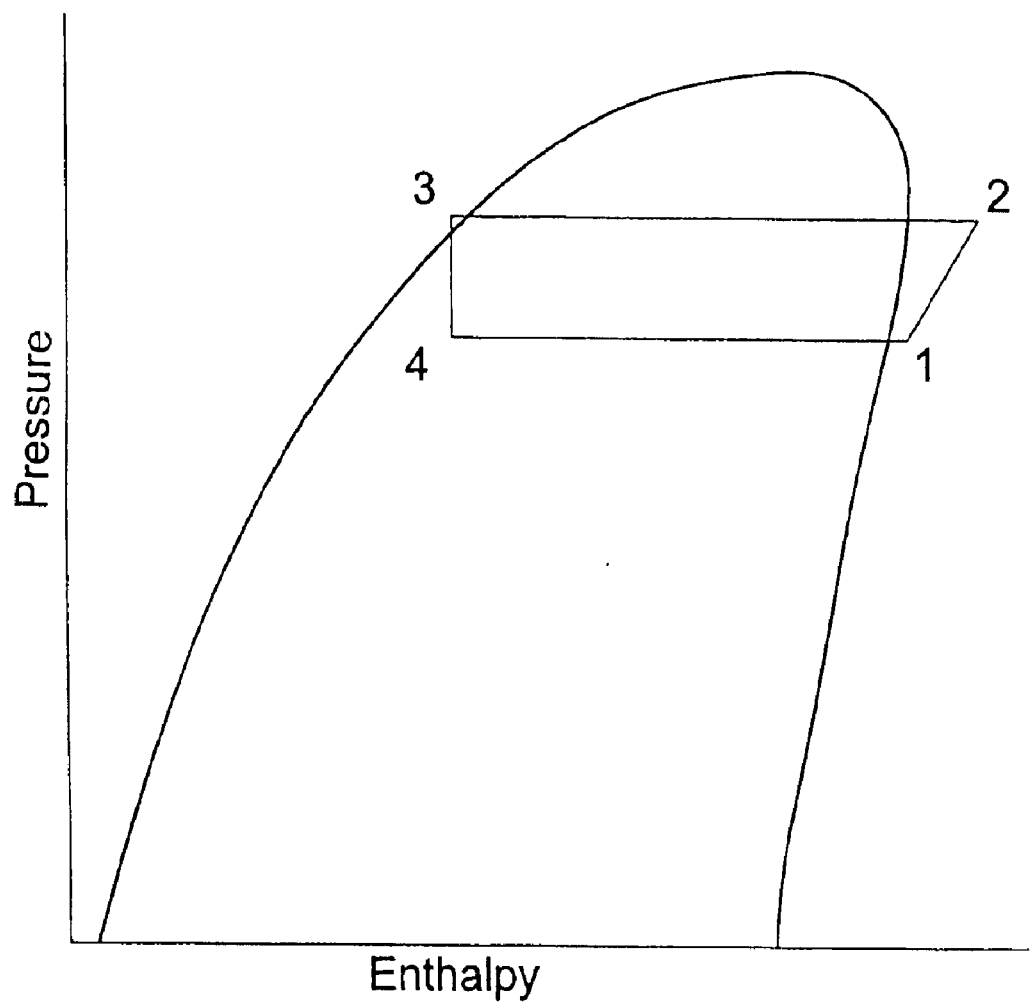
FIG. 1 is a representation of the refrigeration process on a pressure enthalpy diagram.
Figure 2:
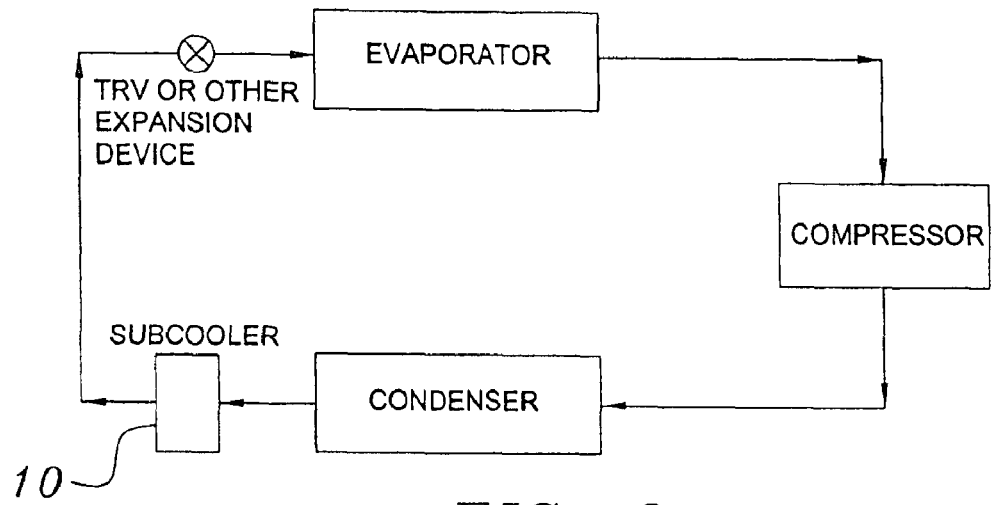
FIG. 2 is a hardware schematic of the vapor compression cycle for an air conditioner, refrigeration or heat pump system showing the location of the building exhaust air or outdoor air and condensate (or other) water evaporatively cooled (or alternatively air only, sensibly cooled) subcooler.
Figure 2A:
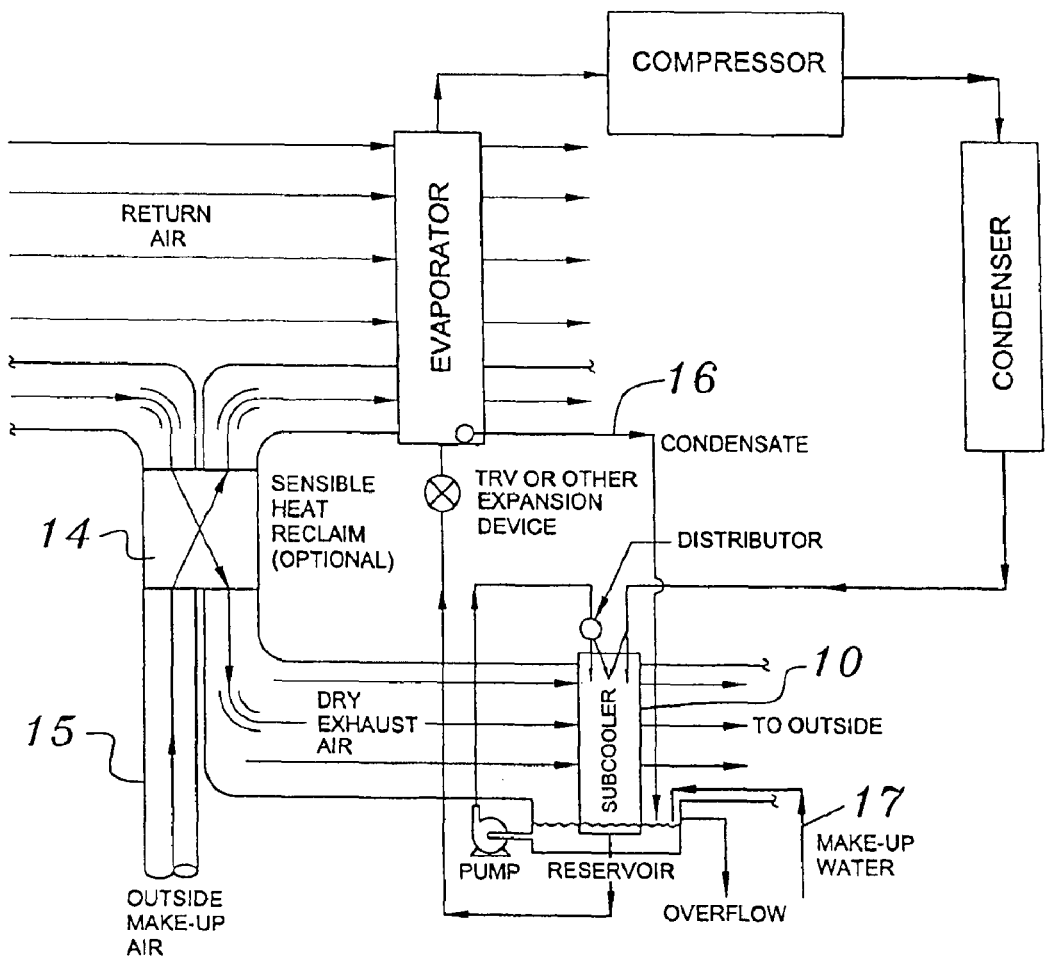
FIG. 2a is a perspective view showing the relationship between the liquid refrigerant subcool heat exchanger and a possible flow direction of the building exhaust air through the condensate and/or other water wetted(or dry, air cooled only) subcooler.
Figure 2B:
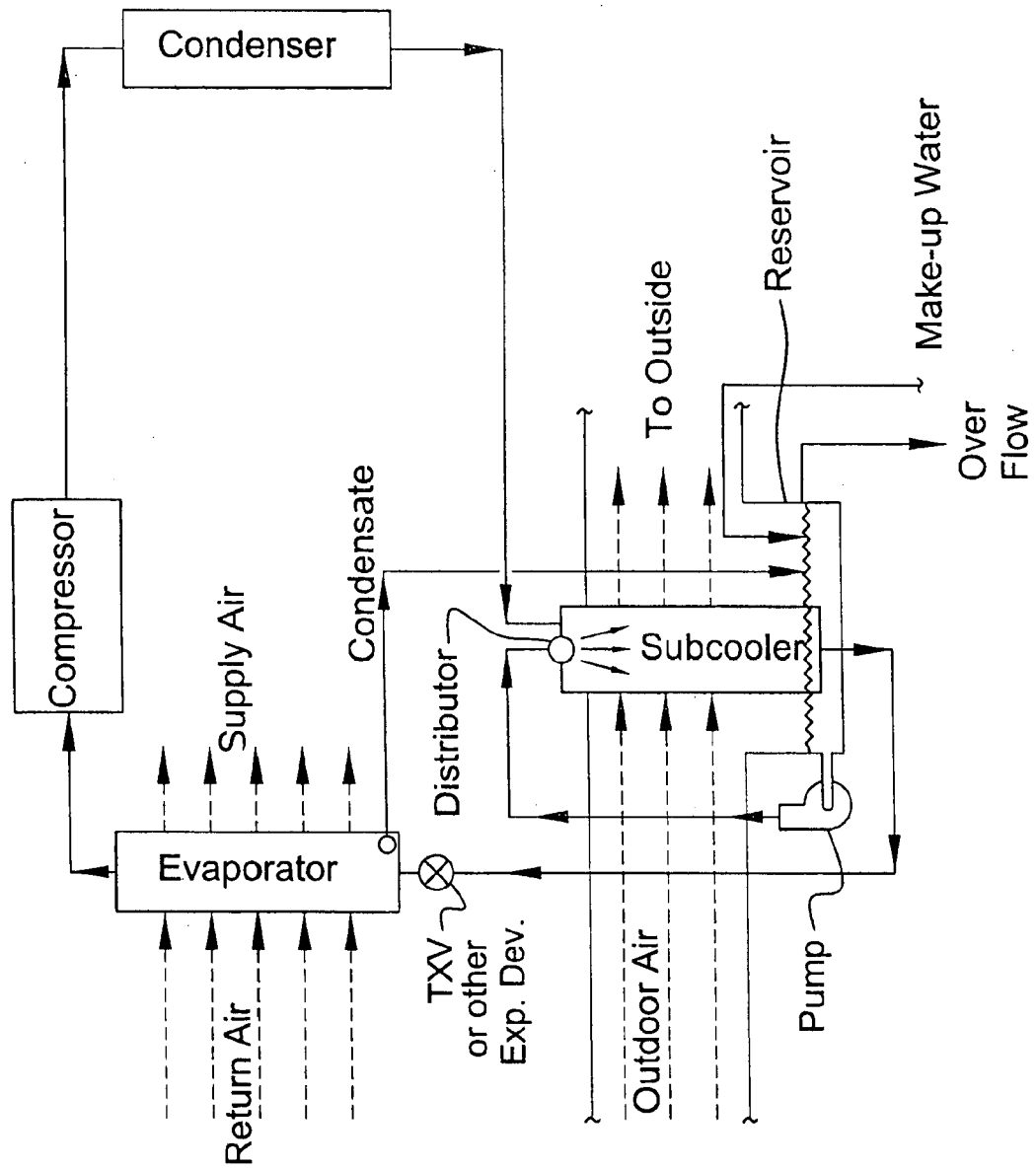
FIG. 2b is a perspective view showing the relationship between the liquid refrigerant subcool heat exchanger and a possible flow direction of outside air through the condensate and/or other water wetted subcooler.

First, for the subcooler only (10) of the present invention, as illustrated in FIGS. 2, 2a, and 2b, a subcooler for the liquid refrigerant relies on evaporative cooling by a means of direct use of the dry, cold building exhaust air (13) required for good indoor air quality (or after the exhaust air first undergoing a sensible heat exchange (14) with the incoming make up air (15) (or alternatively with outdoor air) to evaporate the water supplied by the condensate discharge (16) from the air conditioner, refrigeration or heat pump system, and/or other water (17) supplied from a municipal or other water supply system, wetted subcooler, which in turn cools the liquid refrigerant in the subcooler. Alternatively, the cool building exhaust air only could be used to sensibly cool the liquid refrigerant in the subcooler.

The exhaust air (13) from a building's air supply is generally much more constant in temperature and humidity than is outside ambient air. Further, this exhaust air (13) is generally much cooler and dryer than outside air, especially when air conditioning loads are high. Even after a sensible heat exchange (14) with incoming make up air (15) the low wet bulb temperature of the outgoing air is minimally affected, and is substantially lower than that of the outside air supply. By passing this relatively dry air across a wetted surface both the sensible air temperature and the water temperature will approach that of the wet bulb temperature of the building exhaust air. A refrigerant passing through a heat exchanger that has been wetted and that has the relatively dry air passing across it will be cooled by the evaporative cooling effect created by the dry air evaporating the water on the heat exchanger. Outdoor air, although less effective, is still very effective with use across said wetted subcooler and can be used alternatively.

Figure 3:
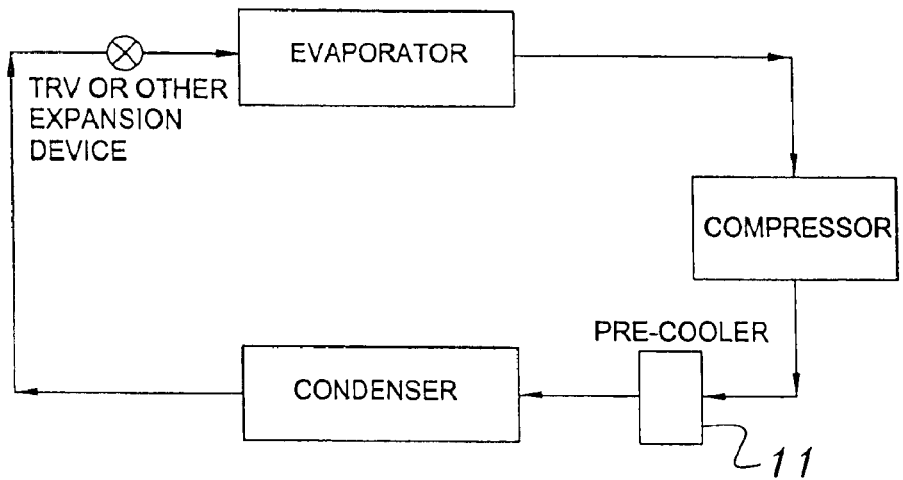
FIG. 3 is a hardware schematic of the vapor compression cycle for an air conditioner, refrigeration or heat pump system showing the location of the building exhaust air or alternatively outdoor air and condensate (or other) water evaporatively cooled(or alternatively air only, sensibly cooled) precooler.
Figure 3A:
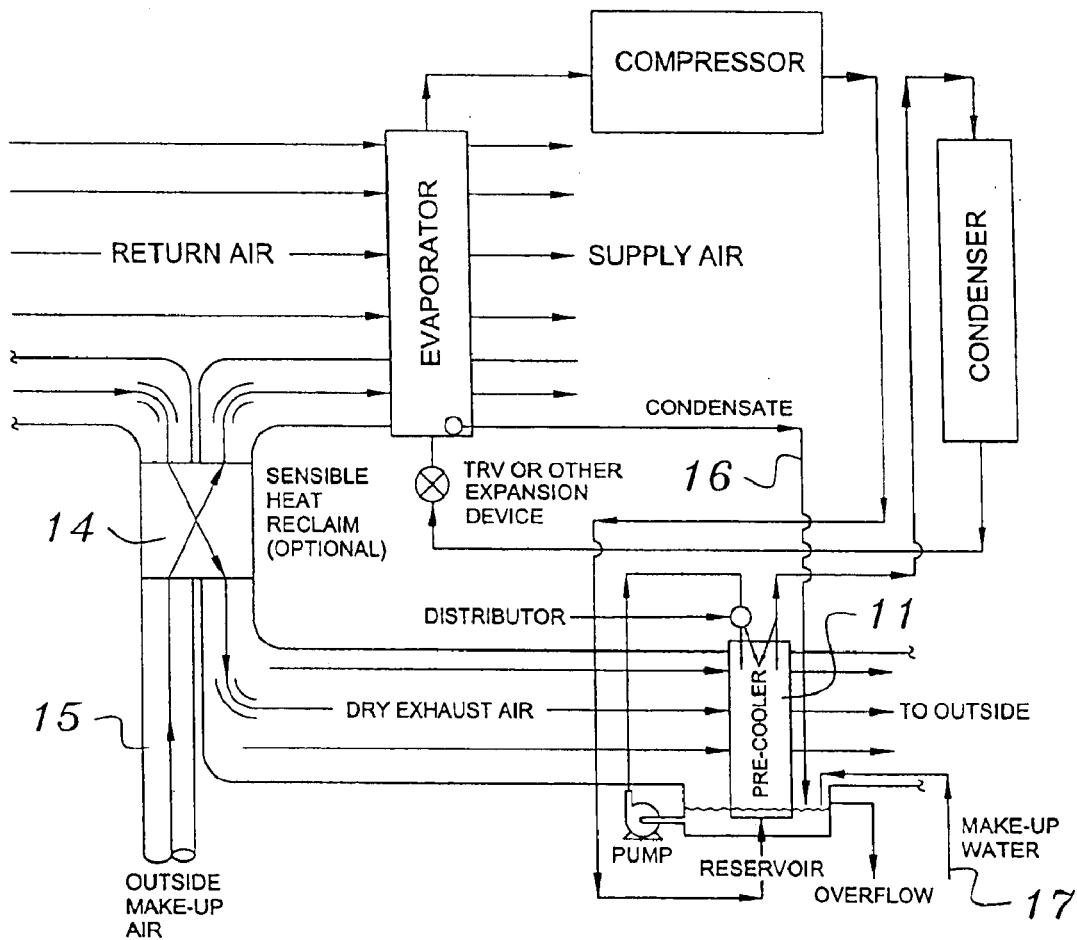
FIG. 3a is a perspective view showing the relationship between the hot gas refrigerant precool heat exchanger and a possible flow direction of the building exhaust air as well as the condensate and/or other water flow through said precooler.
Figure 3B:
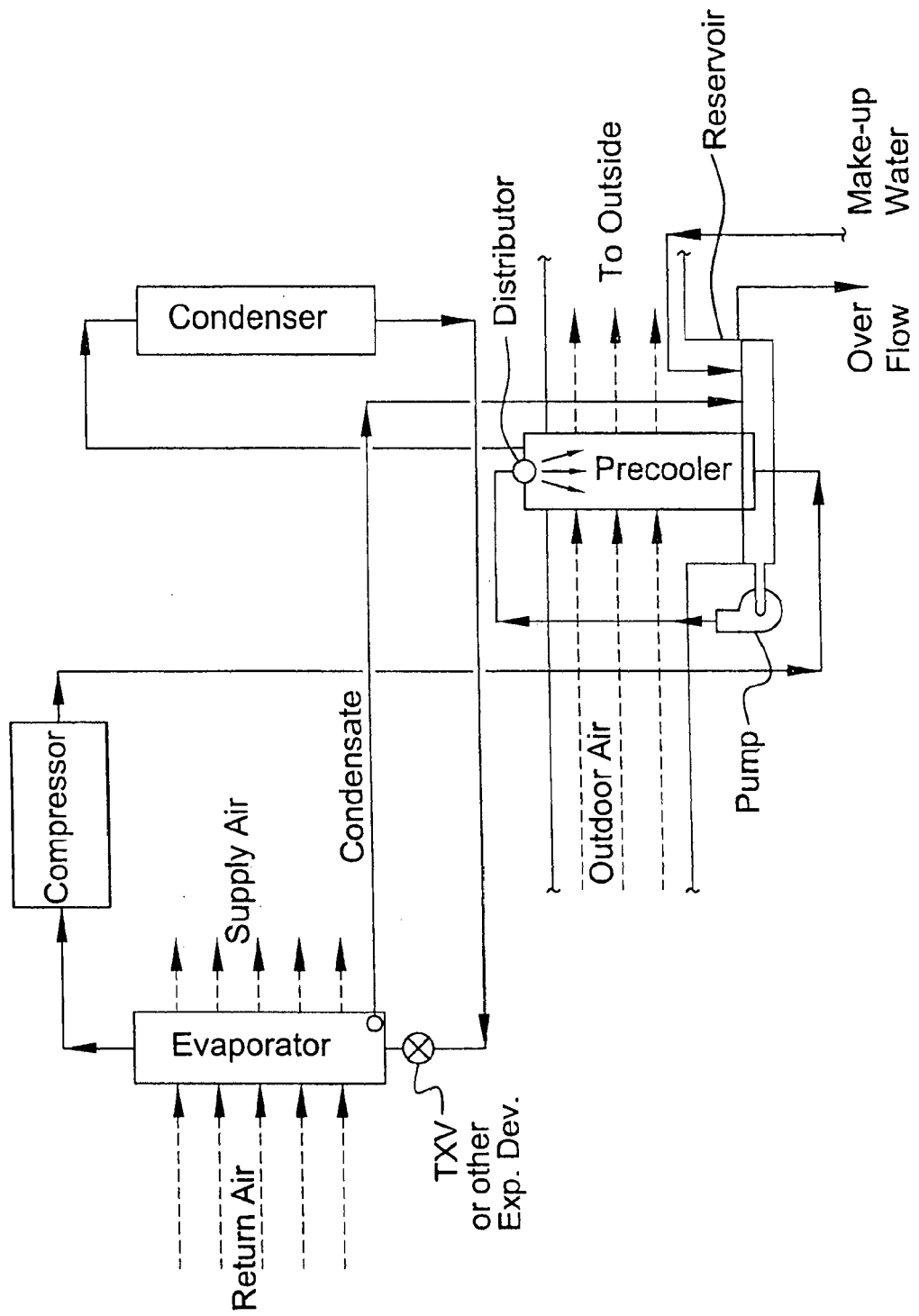
FIG. 3b is a perspective view showing the relationship between the hot gas refrigerant precool heat exchanger and a possible flow direction of outside air through the condensate and/or other water wetted precooler.

For the precooler system only (11) of the present invention, as illustrated in FIGS. 3, 3a, and 3b, a precooler for the hot gas refrigerant relies on evaporative cooling (or alternatively on sensible cooling) by means of a direct use of the dry, cold building exhaust air required for good indoor air quality (alternatively without water) and the use of water supplied by the condensate discharge from the air conditioning or heat pump system and/or other water supply system to precool the hot gas refrigerant flowing through the precooler.

Figure 4:
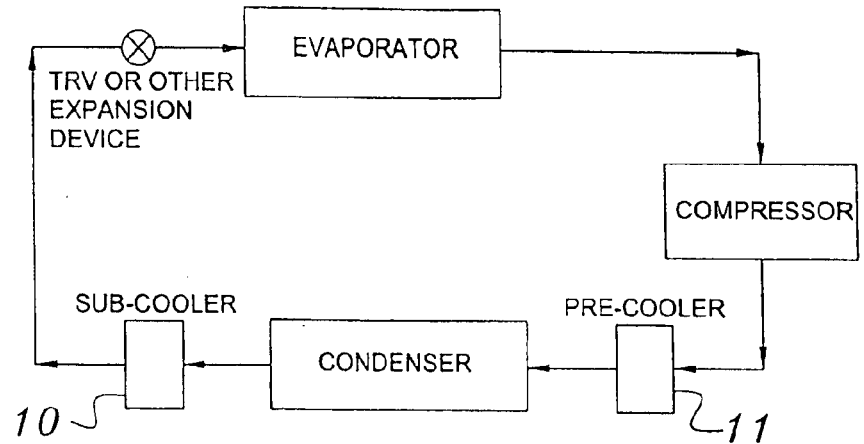
FIG. 4 is a hardware schematic of the vapor compression cycle for an air conditioner refrigeration or heat pump system showing the location of the combined building exhaust air or outdoor air and condensate and/or other water evaporatively(or if no water used, sensibly cooled) cooled subcooler plus secondary use combined building exhaust air or outdoor air and condensate and/or other water evaporatively cooled (or if secondary exhaust air used only, sensibly cooled) precooler.
Figure 4A:
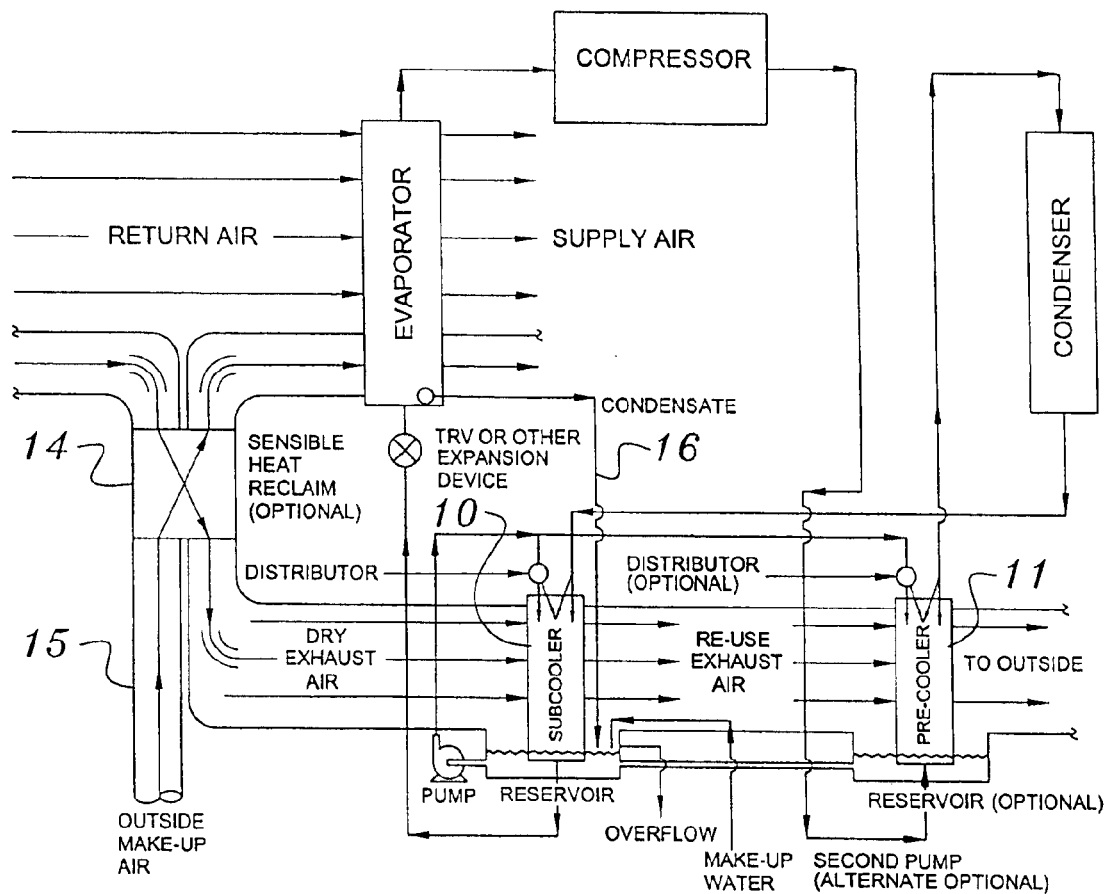
FIG. 4a is a perspective view showing the relationship between the liquid refrigerant subcool heat exchanger and the hot gas refrigerant precool heat exchanger and the possible flow direction of the building exhaust air through, as well as a possible flow direction of the condensate and/or other water across said subcooler and precooler
Figure 4B:
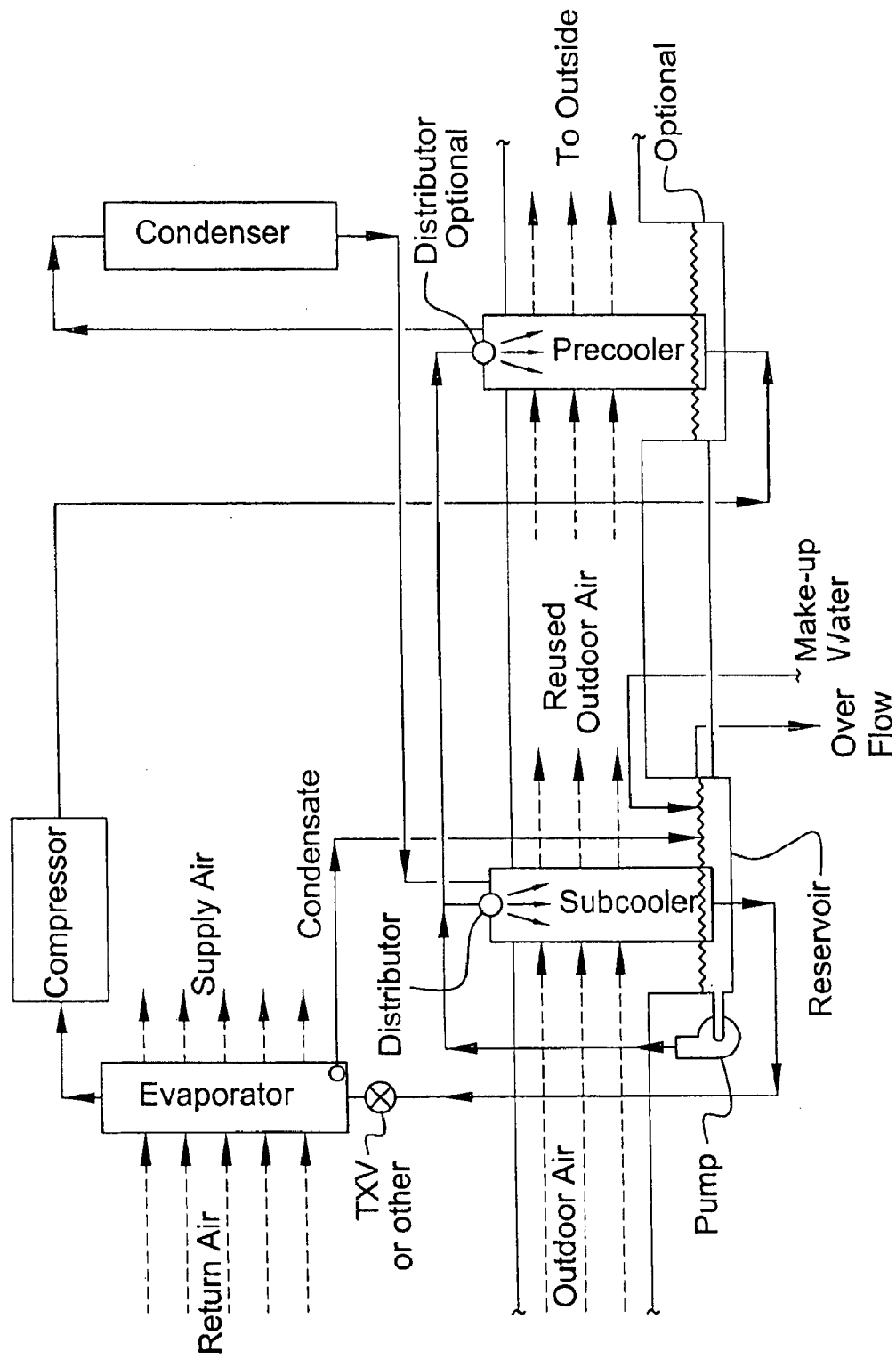
FIG. 4b is a perspective view showing the relationship between the liquid refrigerant subcool heat exchanger and the hot gas refrigerant precool heat exchanger and a possible flow direction of outside air through a condensate(and/or other water) wetted subcooler and then the air exhausting from the subcooler flowing through a condensate (and/or other water) wetted precooler(or alternatively through a dry precooler).

For the subcooler (10) plus precooler (11) combination of the present invention, as illustrated in FIGS. 4, 4a, and 4b, a subcooler (10) for the liquid refrigerant and a precooler (11) for the hot gas refrigerant relies on an evaporative cooling process that will be used twice; a first use of the dry, cold building exhaust air (or alternatively outside air, FIG. 4b) and condensate (or other) water supply that will first evaporatively cool the subcool heat exchanger which in turn cools the liquid refrigerant flowing through the subcooler and then the air supply passing out of the subcooler will flow through the wetted (or alternatively dry) precooler to evaporatively (or alternatively sensibly) cool the precool heat exchanger which in turn cools the hot gas refrigerant flowing through the precooler. The subcooler and precooler to be connected in serial communication in the refrigeration cycle as shown in FIG. 4. The precooler may or may not be wetted for this secondary use of the air discharging through the subcooler. If not wetted, the precool heat exchanger is sensibly cooled by the exhaust air supply, exiting the subcooler only.

Figure 5:
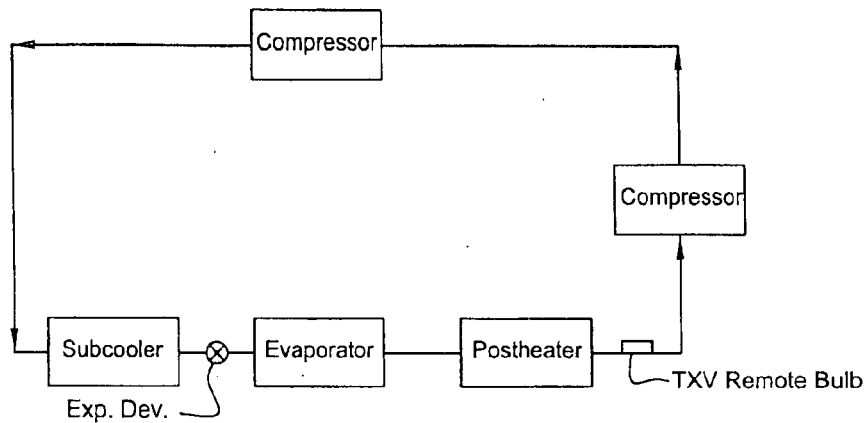
FIG. 5 is a hardware schematic of the vapor compression cycle for a heat pump in the heating mode (condenser in conditioned space) showing the location of the combined building exhaust air cooled, subcooler and a postheater that absorbs heat from a secondary pass of this subcooler heated building exhaust air or alternatively using outdoor air through said subcooler first, before reclaiming the liquid heat in the post heater.
Figure 5A:
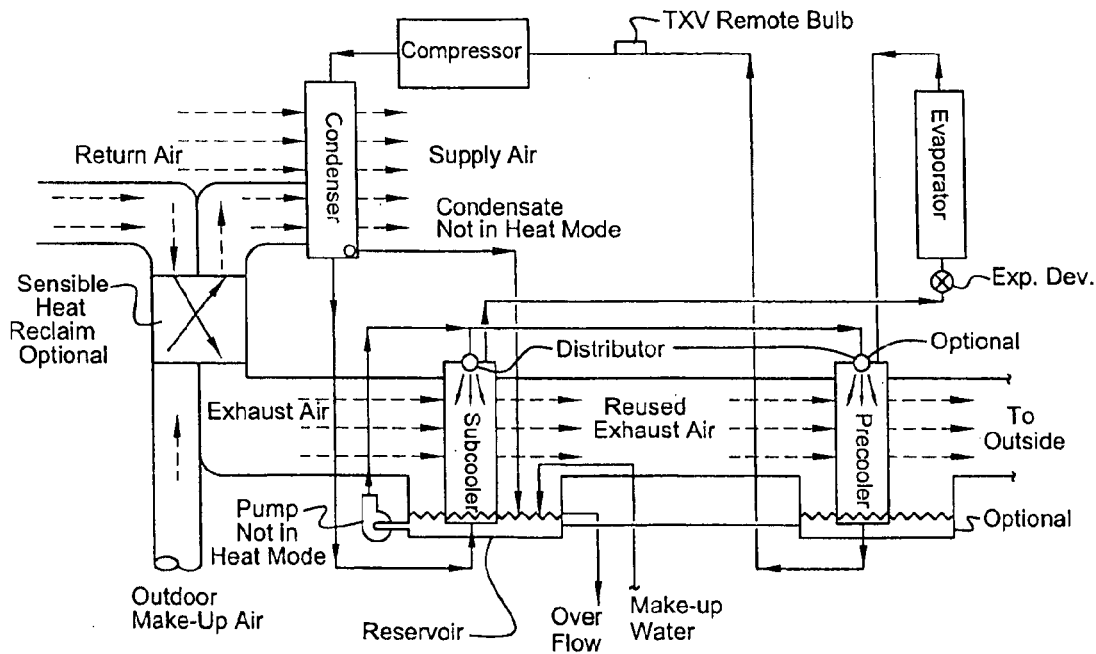
FIG. 5a is a perspective view showing the relationship between the liquid refrigerant subcool heat exchanger and the suction gas refrigerant postheater heat exchanger and a possible flow direction of the building exhaust air through said subcooler and postheater.
Figure 5B:
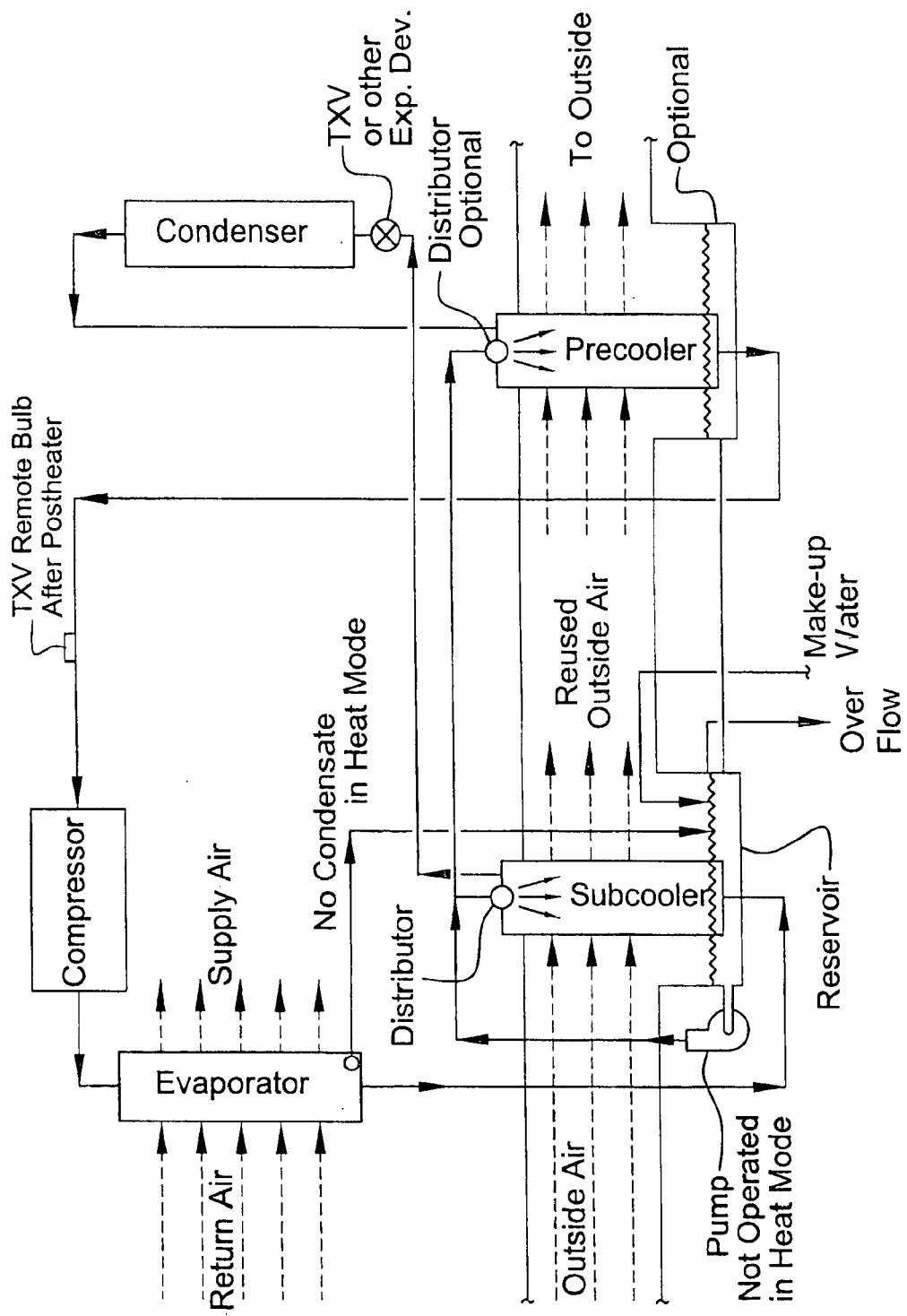
FIG. 5b is a perspective view showing the relationship between the liquid refrigerant subcool heat exchanger and the suction gas refrigerant postheater heat exchanger and a possible flow direction of outside air through said subcooler and postheater.

FIGS. 5, 5a, and 5b. for the subcooler (10) plus postheater (12) combination of the present invention, as illustrated in FIGS. 5, and 5a a subcooler (10) for the liquid refrigerant and a postheater for the suction gas and liquid refrigerant rely on a sensible (conductive) cooling of the liquid refrigerant by means of passing the building exhaust air, which is cool relative to the liquid refrigerant temperature, through the subcool heat exchanger which in turn subcools the liquid refrigerant flowing through the subcooler and in turn further heats the outgoing building exhaust air. Then the air supply passing out of the subcooler flows through the postheater heat exchanger, which is cold relative to the subcooler warmed building exhaust air because the liquid and gas refrigerant in the postheater are on the low pressure side of the vapor compression cycle and located mechanically between the primary evaporator and the compressor. The subcooler warmed building exhaust air heat completes the evaporation of the liquid refrigerant and superheats the suction gas refrigerant. The subcooler and postheater to be connected in serial communication in the refrigeration cycle as shown in FIG. 5. FIG. 5b illustrates the same relationship between a subcooler (10) and a postheater (12) as in FIG. 5a, but illustrates the use of outside air to first subcool the liquid refrigerant and then using the subcooler warmed air to postheat the low pressure side gas and liquid refrigerant flowing through said postheater.

Figure 6:
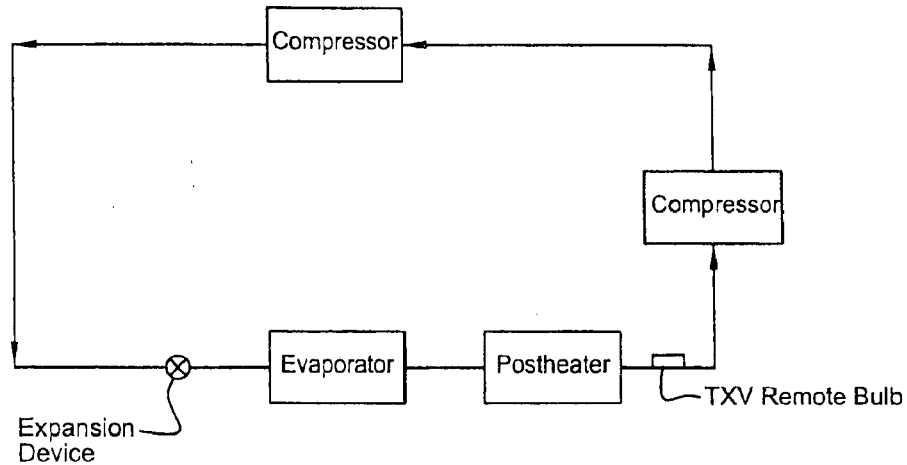
FIG. 6 is a hardware schematic of the vapor compression cycle for a heat pump in the heating mode(condenser in conditioned space) showing the location of the building exhaust air heated postheater.
Figure 6A:
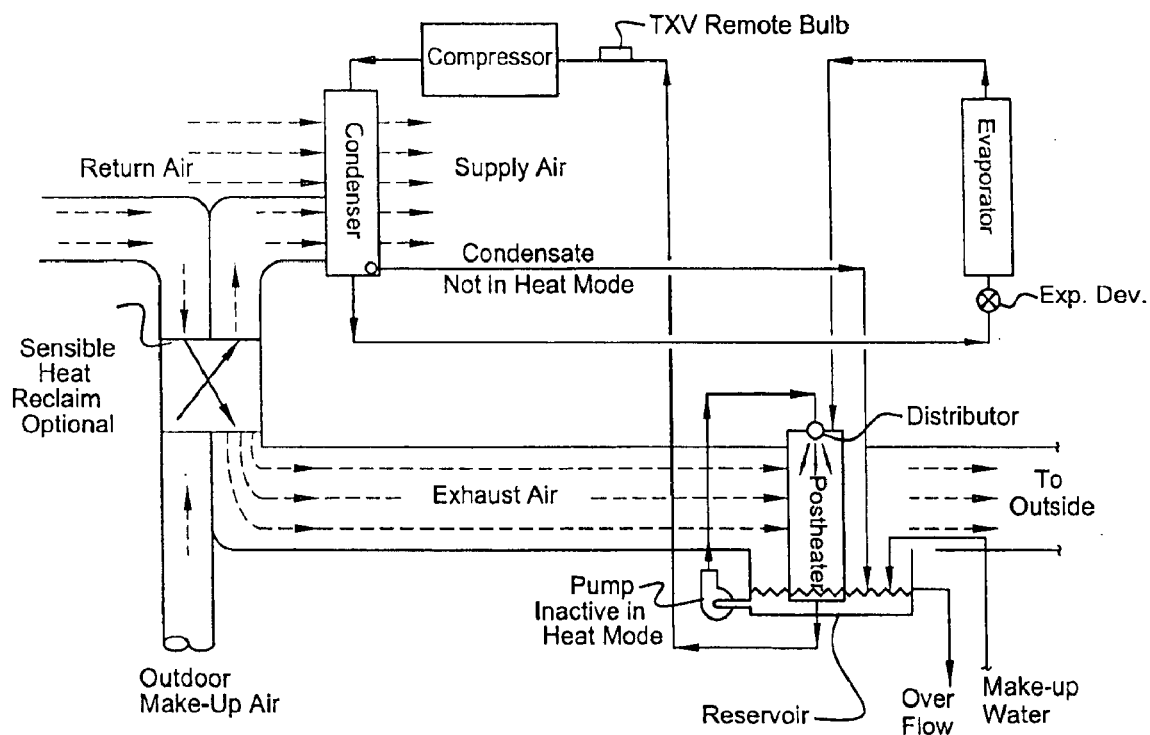
FIG. 6a is a perspective view showing the relationship between the suction gas refrigerant postheater heat exchanger and a possible flow direction of building exhaust air through said postheater.

For the postheater (12) only of the present invention as illustrated in FIGS. 6, and 6a, a postheater for the low pressure side of the vapor compression cycle gas and liquid refrigerant flowing out of the primary evaporator relies on relatively warm (to outside conditions) building exhaust air required for good indoor air quality to finish the evaporation of the liquid refrigerant and to superheat the gas flowing through the postheater. The postheater to be connected in serial communication in the refrigeration (heat pump) cycle as shown in FIG. 6.

Figure 7:
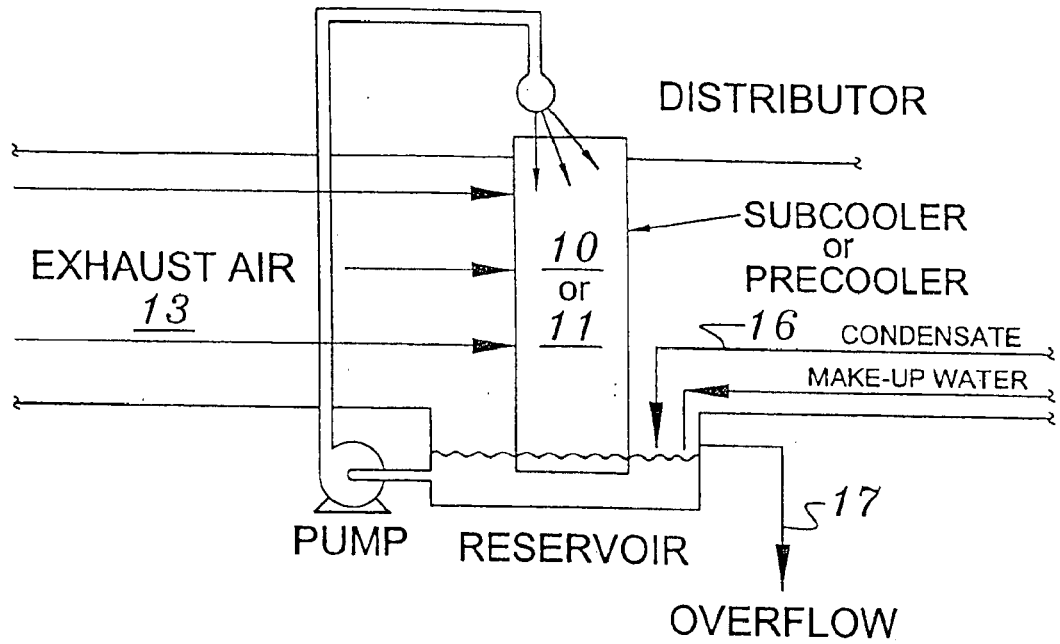
FIG. 7 is a hardware schematic showing some of the possible pump and control mechanisms for controlling the flow of condensate and/or other water across the subcooler and precooler heat exchangers.

FIG. 7 is illustrative of some of the possible pump and control mechanisms for controlling the flow of condensate (or other) water across the subcooler and/or precooler heat exchangers. The methods illustrated include a mechanically pumped method whereby water is distributed across the top of the subcool and/or precool heat exchangers and allowed to flow down through the heat exchanger(s), perpendicular to the flow of the cold, dry building exhaust air.

Figure 8:
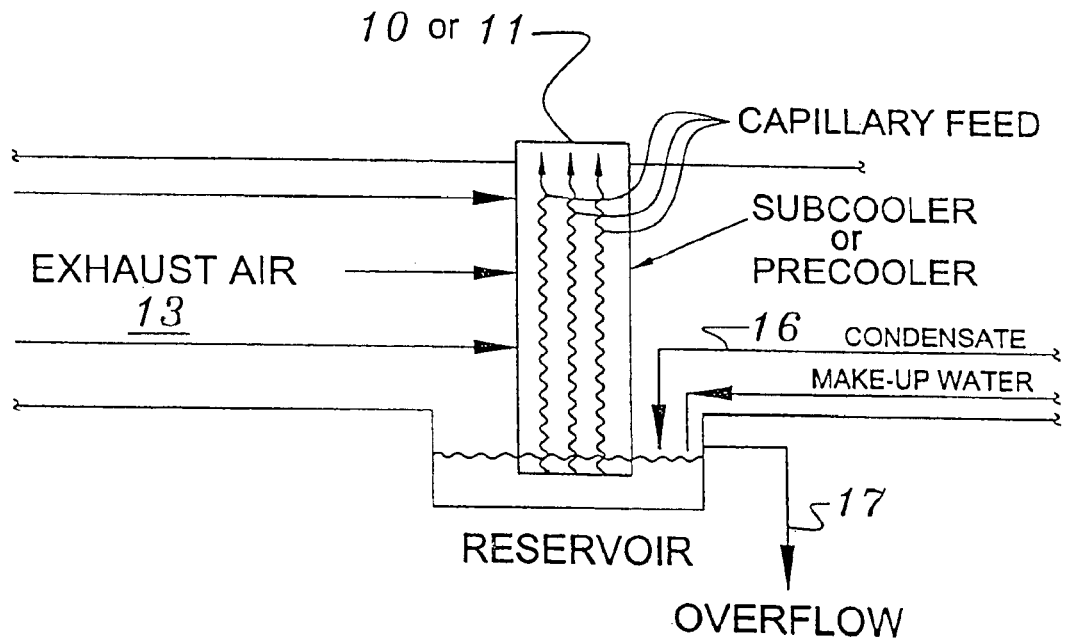
FIG. 8 is a hardware schematic showing an alternative non pumped, capillary feed system for wetting the heat exchanger(s) with condensate and/or other water.

FIG. 8 is illustrative of a capillary feed method that pulls water up onto the surface of the heat exchangers by means of the surface tension of water.

The increase in efficiency due to subcooling is well known and is due to the increase in capacity due to subcooling of the liquid refrigerant. What is unique in this invention is the innovative use of the cold, dry building exhaust air required for good indoor air quality (or alternatively, the use of outdoor air) and the use of condensate (or other) water to accomplish subcooling evaporatively or to use building exhaust air only to sensibly subcool the liquid refrigerant.

The increased efficiency of the refrigeration cycle due to precooling is due to lower head pressure, higher compressor efficiency and more efficient use of the primary condenser. The unique and innovative use of the cold, dry building exhaust air (or alternatively outdoor air) required for good indoor air quality and the use of condensate (or other) water to accomplish precooling evaporatively, or to accomplish precooling by using the exhaust air(or outside air) after first use in the subcooler or conductively using only the exhaust air after subcooling, is extremely cost effective.

The increase in efficiency of the refrigeration due to postheating is derived from the additional heat provided by the postheater to the evaporator side of the refrigeration cycle. A higher suction pressure is maintained meaning higher mass flow and higher heating capacity at a higher coefficient of performance. The unique and innovative use of the building exhaust air (or outdoor air) to first absorb heat from a subcooler to add reclaimed heat to the postheater is extremely cost effective.

The present disclosure includes that contained in the appended claims, as well as that of the foregoing description. Although this invention has been described in its preferred form with a certain degree of particularity, it could be understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A heat exchange refrigerant subcool system that utilizes stored condensate water from an air conditioner, refrigeration or heat pump system or other water supply that is then pumped across a heat exchanger while the cold, dry building exhaust air is passed over said heat exchanger for evaporatively subcooling a liquid refrigerant that has already passed through the condenser of said air conditioner, refrigeration or heat pump system comprising in combination:
   a) a subcooler serially connected in fluid communication with the output of the condenser and input to the evaporator, enabling the refrigerant to flow through said subcooler after first flowing through the condenser;
   b) a reservoir located below the subcooler that receives the condensate discharge from said air conditioner, refrigeration or heat pump and that also receives any needed make up water;
   c) said reservoir connected in fluid communication with the input of a pump that pumps stored condensate and make up water through a control system that enables the correct amount of water to flow across and wet the surface of said subcooler and then back to storage in the reservoir;
   d) said wetted subcooler connected in fluid communication with the cold, dry building exhaust air that subsequently cools by evaporation the water flowing over the subcooler which in turn cools the refrigerant in the subcooler; and
   e) a means for said water to overflow to discharge, whereby said subcooler utilizes said evaporative cooling process for providing maximum available subcooling to the liquid refrigerant of an air conditioner, refrigeration or heat pump system.

2. A heat exchange refrigerant subcool system that utilizes stored condensate water from an air conditioner, refrigeration or heat pump system or other water supply that is then pumped across a heat exchanger while the outdoor air is passed over said heat exchanger for evaporatively subcooling a liquid refrigerant that has already passed through the condenser of said air conditioner, refrigeration or heat pump system comprising in combination:
   a) a subcooler serially connected in fluid communication with the output of the condenser and input to the evaporator, enabling the refrigerant to flow through said subcooler after first flowing through the condenser;
   b) a reservoir located below the subcooler that receives the condensate discharge from said air conditioner, refrigeration or heat pump and that also receives any needed make up water;
   c) Said reservoir connected in fluid communication with the input of a pump that pumps stored condensate and make up water through a control system that enables the correct amount of water to flow across and wet the surface of said subcooler and then back to storage in the reservoir;
   d) said wetted subcooler connected in fluid communication with the outdoor air that subsequently cools by evaporation the water flowing over the subcooler which in turn cools the refrigerant in the subcooler; and
   e) a means for said water to overflow to discharge, whereby said subcooler utilizes said evaporative cooling process for providing maximum available subcooling to the liquid refrigerant of an air conditioner, refrigeration or heat pump system.

3. A heat exchange refrigerant subcool system that utilizes condensate and make up water in a passive, capillary effect feed method, coupled with cold, dry building exhaust air for evaporatively subcooling a refrigerant that has already passed through the condenser of an air conditioner, refrigeration or heat pump system, comprising in combination:
   a) a subcooler serially connected in fluid communication with the output of the condenser, enabling the refrigerant to flow through said subcooler after first flowing through the condenser;
   b) the bottom of said subcooler placed in a water storage tank that receives the condensate water from an air conditioner, refrigeration or heat pump and any needed make up water for a capillary feed of said water to wet the surface of said subcool heat exchanger;
   c) said wetted subcooler further connected in fluid communication with the cold dry building exhaust air that subsequently cools the water being fed by capillary action onto the subcooler, which in turn cools the refrigerant in the subcooler; and
   d) a means for said water to overflow to discharge, whereby said subcooler utilizes said evaporative cooling process for providing maximum available subcooling to the liquid refrigerant.

4. A heat exchange refrigerant subcool system that utilizes condensate and make up water in a passive, capillary effect feed method, coupled with outdoor air for evaporatively subcooling a refrigerant that has already passed through the condenser of an air conditioner, refrigeration or heat pump system, comprising in combination:
   a) a subcooler serially connected in fluid communication with the output of the condenser, enabling the refrigerant to flow through said subcooler after first flowing through the condenser;
   b) the bottom of said subcooler placed in a water storage tank that receives the condensate water from an air conditioner, refrigeration or heat pump and any needed make up water for a capillary feed of said water to wet the surface of said subcool heat exchanger;
   c) said wetted subcooler further connected in fluid communication with the outdoor air that subsequently cools the water being fed by capillary action onto the subcooler, which in turn cools the refrigerant in the subcooler; and
   d) a means for said water to overflow to discharge, whereby said subcooler utilizes said evaporative cooling process for providing maximum available subcooling to the liquid refrigerant.

5. A heat exchange refrigerant precool system that utilizes the condensate water discharge from an air conditioner, refrigeration or heat pump system and make up water that is then pumped across a heat exchanger while the cold, dry building exhaust air is also passing over said heat exchanger for evaporatively precooling a hot gas refrigerant before said refrigerant passes into the condenser of said air conditioner, refrigeration or heat pump system, comprising in combination:
   a) a precooler serially connected in fluid communication with the output of a compressor and the input of a condenser, enabling the hot gas refrigerant to flow through said precooler before passing into the condenser.
   b) A reservoir located beneath the precooler that receives the condensate discharge from said air conditioner, refrigeration or heat pump system and that also receives any needed make-up water;

c) said reservoir connected in fluid communication with the input of a pump that pumps the stored condensate water through a control system that enables the correct amount of condensate and make-up water to flow across and wet the surface of said precooler and then back to storage;

d) said wetted precooler further connected in fluid communication with cold, dry building exhaust air that subsequently cools by evaporation the water flowing over the precooler which in turn cools the refrigerant in the precooler; and e) means for said water to overflow to discharge, whereby said precooler utilizes said evaporative cooling process for providing maximum available precooling to the refrigerant before said refrigerant passes into the condenser of said air conditioner, refrigeration or heat pump system.

6. A heat exchange refrigerant precool system that utilizes the condensate water discharge from an air conditioner, refrigeration or heat pump system and make-up water that is then pumped across a heat exchanger while the outdoor air is also passing over said heat exchanger for evaporatively precooling a hot gas refrigerant before said refrigerant passes into the condenser of said air conditioner, refrigeration or heat pump system, comprising in combination:

a) a precooler serially connected in fluid communication with the output of a compressor and the input of a condenser, enabling the hot gas refrigerant to flow through said precooler before passing into the condenser.

b) a reservoir located beneath the precooler that receives the condensate discharge from said air conditioner, refrigeration or heat pump system and that also receives any needed make-up water;

c) said reservoir connected in fluid communication with the input of a pump that pumps the stored condensate water through a control system that enables the correct amount of condensate and make-up water to flow across and wet the surface of said precooler and then back to storage;

d) said wetted precooler further connected in fluid communication with outdoor air that subsequently cools by evaporation the water flowing over the precooler which in turn cools the refrigerant in the precooler; and e) a means for said water to overflow to discharge, whereby said precooler utilizes said evaporative cooling process for providing maximum available precooling to the refrigerant before said refrigerant passes into the condenser of said air conditioner, refrigeration or heat pump system.

7. A heat exchange refrigerant precool system that utilizes the condensate water from an air conditioner, refrigeration or heat pump system and make-up water in a passive, capillary effect feed method, coupled with cold, dry building exhaust air for evaporatively precooling a refrigerant before said refrigerant passes into the condenser of said air conditioner, refrigeration or heat pump system comprising in combination:

a) a precooler serially connected in fluid communication with the output of a compressor, then to the input of a condenser, enabling the hot gas refrigerant discharge from a compressor to flow through said precooler before passing into the condenser;

b) the bottom of said precooler sitting in a water storage reservoir that receives the condensate water from an air conditioner, refrigeration or heat pump system and any needed make-up water for a capillary action feed of said water into the precool heat exchanger;

c) said precooler further connected in fluid communication with cold, dry building exhaust air that subsequently cools by evaporation the water being fed by capillary action into the precooler which in turn cools the hot gas refrigerant in the precooler; and d) A means for said condensate and make-up water to overflow to discharge, whereby said precooler utilizes the said evaporative cooling process for providing maximum available precooling to the pre-condenser refrigerant of said air conditioner, refrigeration or heat pump system.

8. A heat exchange refrigerant precool system that utilizes the condensate water from an air conditioner, refrigeration or heat pump system and make-up water in a passive, capillary effect feed method, coupled with outdoor air for evaporatively precooling a refrigerant before said refrigerant passes into the condenser of said air conditioner, refrigeration or heat pump system comprising in combination:

a) a precooler serially connected in fluid communication with the output of a compressor, then to the input of a condenser, enabling the hot gas refrigerant discharge from a compressor to flow through said precooler before passing into the condenser;

b) the bottom of said precooler sitting in a water storage reservoir that receives the condensate water from an air conditioner, refrigeration or heat pump system and any needed make-up water for a capillary action feed of said water into the precool heat exchanger;

c) said precooler further connected in fluid communication with outdoor air that subsequently cools by evaporation the water being fed by capillary action into the precooler which in turn cools the hot gas refrigerant in the precooler; and d) A means for said condensate and make-up water to overflow to discharge, whereby said precooler utilizes the said evaporative cooling process for providing maximum available precooling to the pre-condenser refrigerant of said air conditioner, refrigeration or heat pump system.

9. A combination subcool and precool heat exchanger system that utilizes the stored condensate water from an air conditioner, refrigeration or heat pump system and any needed make-up water that is first pumped across a first heat exchanger while the cold, dry building exhaust air is also passed over said first heat exchanger for first evaporatively subcooling the liquid refrigerant that has passed through the condenser of said air conditioner, refrigeration or heat pump system and then the air exhausting from the first heat exchanger subsequently passed through a second water wetted heat exchanger(a precooler) for subsequently precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler after first flowing through the condenser and then the evaporator;

b) the second heat exchanger, a precooler serially connected in fluid communication with the output of a compressor and the input to the condenser, enabling the hot gas refrigerant to flow from the compressor through said precooler before passing into the condenser;

c) a reservoir system below the subcooler and precooler that receives the condensate and make-up water supplies;

d) said reservoir system connected in fluid communication with the input of a pump that pumps stored condensate and make-up water through a control system that enables the correct amount of condensate and/or make-up water to flow across and wet the surfaces of said subcooler and said precooler;

e) said subcooler further connected in fluid communication with cold, dry building exhaust air that subsequently cools by evaporation the water flowing over the subcooler which in turn cools the liquid refrigerant in the subcooler; and f) said precooler connected in fluid communication with the airflow output of the subcooler of the previously used building exhaust air, said previously used building exhaust air passing through said condensate and make-up water supply wetted precooler heat exchanger, where said exhaust air cools by evaporation the water flowing over the precooler which in turn precools the hot gas refrigerant flowing through the precooler; and g) means for said condensate and make-up water to overflow to discharge, whereby said subcool and precool system utilizes said evaporative cooling for providing maximum available subcooling to the liquid refrigerant and maximum available precooling to the hot gas discharge refrigerant of said air conditioner, refrigeration or heat pump system.

10. A combination subcool and precool heat exchanger system that utilizes the stored condensate water from an air conditioner, refrigeration or heat pump system and any needed make-up water that is first pumped across a first heat exchanger while outdoor air is also passed over said first heat exchanger for first evaporatively subcooling the liquid refrigerant that has passed through the condenser of said air conditioner, refrigeration or heat pump system and then the air exhausting from the first heat exchanger subsequently passed through a second water wetted heat exchanger(a precooler) for subsequently precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler after first flowing through the condenser and then the evaporator;

b) the second heat exchanger, a precooler serially connected in fluid communication with the output of a compressor and the input to the condenser, enabling the hot gas refrigerant to flow from the compressor through said precooler before passing into the condenser;

c) a reservoir system below the subcooler and precooler that receives the condensate and make-up water supplies;

d) said reservoir system connected in fluid communication with the input of a pump that pumps stored condensate and make-up water through a control system that enables the correct amount of condensate and/or make-up water to flow across and wet the surfaces of said subcooler and said precooler;

e) said subcooler further connected in fluid communication with outdoor air that subsequently cools by evaporation the water flowing over the subcooler which in turn cools the liquid refrigerant in the subcooler; and f) said precooler connected in fluid communication with the airflow output of the subcooler of the previously used building exhaust air, said previously used outdoor air passing through said condensate and make-up water supply wetted precooler heat exchanger, where said outdoor air cools by evaporation the water flowing over the precooler which in turn precools the hot gas refrigerant flowing through the precooler; and g) means for said condensate and make-up water to overflow to discharge, whereby said subcool and precool system utilizes said evaporative cooling for providing maximum available subcooling to the liquid refrigerant and maximum available precooling to the hot gas discharge refrigerant of said air conditioner, refrigeration or heat pump system.

11. A combination subcool and precool heat exchanger system that utilizes the stored condensate water from an air conditioner, refrigeration or heat pump system and any needed make-up water that is first pumped across a first heat exchanger while the cold, dry building exhaust air is also passed over said first heat exchanger for first evaporatively subcooling the liquid refrigerant that has passed through the condenser of said air conditioner, refrigeration or heat pump system and then the air exhausting from the first heat exchanger subsequently passed through a second water wetted heat exchanger (a precooler) for subsequently precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler after first flowing through the condenser and then the evaporator;

b) the second heat exchanger, a precooler serially connected in fluid communication with the output of a compressor and the input to the condenser, enabling the hot gas refrigerant to flow from the compressor through said precooler before passing into the condenser;

c) separate reservoir systems; one each below the subcooler and one below the precooler that receives the condensate and make-up water supplies;

d) said reservoir systems connected in fluid communication with the input of two (2) pumps, one that pumps stored condensate and make-up water through a control system that enables the correct amount of condensate and/or make-up water to flow across and wet the surfaces of said subcooler and one that pumps stored condensate and make-up water through a control system that enables the correct amount of condensate and/or make-up water to flow across and wet the surfaces of said precooler;

e) said subcooler further connected in fluid communication with cold, dry building exhaust air that subsequently cools by evaporation the water flowing over the subcooler which in turn cools the liquid refrigerant in the subcooler; and f) said precooler connected in fluid communication with the airflow output of the subcooler of the previously used building exhaust air, said previously used building exhaust air passing through said condensate and make-up water supply wetted precooler heat exchanger, where said exhaust air cools by evaporation the water flowing over the precooler which in turn precools the hot gas refrigerant flowing through the precooler; and g) means for said condensate and make-up water to overflow to discharge, whereby said subcool and precool system utilizes said evaporative cooling for providing maximum available subcooling to the liquid refrigerant and maximum available precooling to the hot gas discharge refrigerant of said air conditioner, refrigeration or heat pump system.

12. A combination subcool and precool heat exchanger system that utilizes the stored condensate water from an air conditioner, refrigeration or heat pump system and any needed make-up water that is first pumped across a first heat exchanger while outdoor air is also passed over said first heat exchanger for first evaporatively subcooling the liquid refrigerant that has passed through the condenser of said air conditioner, refrigeration or heat pump system and then the air exhausting from the first heat exchanger subsequently passed through a second water wetted heat exchanger (a precooler) for subsequently precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler after first flowing through the condenser and then the evaporator;

b) the second heat exchanger, a precooler serially connected in fluid communication with the output of a compressor and the input to the condenser, enabling the hot gas refrigerant to flow from the compressor through said precooler before passing into the condenser;

c) separate reservoir systems; one below the subcooler and one below the precooler that receives the condensate and make-up water supplies;

d) said reservoir systems connected in fluid communication with the input of two (2) pumps, one that pumps stored condensate and make-up water through a control system that enables the correct amount of condensate and/or make-up water to flow across and wet the surfaces of said subcooler and one that pumps stored condensate and make-up water through a control system that enables the correct amount of condensate and/or make-up water to flow across and wet the surfaces of said precooler;

e) said subcooler further connected in fluid communication with outdoor air that subsequently cools by evaporation the water flowing over the subcooler which in turn cools the liquid refrigerant in the subcooler; and f) said precooler connected in fluid communication with the airflow output of the subcooler of the previously used building exhaust air, said previously used outdoor air passing through said condensate and make-up water supply wetted precooler heat exchanger, where said outdoor air cools by evaporation the water flowing over the precooler which in turn precools the hot gas refrigerant flowing through the precooler; and g) means for said condensate and make-up water to overflow to discharge, whereby said subcool and precool system utilizes said evaporative cooling for providing maximum available subcooling to the liquid refrigerant and maximum available precooling to the hot gas discharge refrigerant of said air conditioner, refrigeration or heat pump system.

13. A combination subcool and precool heat exchanger system that utilizes the stored condensate water from an air conditioner, refrigeration or heat pump system and any needed make-up water in a passive, capillary effect method coupled with the use of cold, dry building exhaust air for evaporatively subcooling the liquid refrigerant that has passed through the condenser of said air conditioner, refrigeration or heat pump system and then the air exhausting from the first heat exchanger subsequently passed through a second heat exchanger for precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler, then to the evaporator after first flowing through the condenser;

b) a second heat exchanger, a precooler serially connected in fluid communication with the output of a compressor and then to the condenser, enabling the hot gas refrigerant discharge from a compressor to flow through said precooler before passing into the condenser;

c) the bottom of said subcooler placed in a first water storage reservoir that receives the discharge of condensate water from said air conditioner, refrigeration or heat pump system and make-up water for a capillary feed of said water into a first heat exchanger (a subcooler) for purposes of evaporative cooling by means of the cold, dry building exhaust air passing over the wetted surfaces of said subcool heat exchanger;

d) means for said water to pass from the first water storage reservoir into a second water storage reservoir where a second heat exchanger(the precooler) is wetted by capillary action;

e) said precooler is connected in fluid communication with the air flow output of the subcool heat exchanger where the previously used building exhaust air passes through the condensate and make-up water wetted precooler heat exchanger where said building exhaust air cools by evaporating the wet surface of said precooler which in turn precools the hot gas refrigerant passing through the precooler; and f) means for said condensate and make-up water to overflow to discharge whereby said subcool and precool system utilizes said evaporative cooling for providing maximum available subcooling to the liquid refrigerant and maximum available precooling to the hot gas discharge refrigerant of said air conditioner, refrigeration or heat pump system.

14. A combination subcool and precool heat exchanger system that utilizes the stored condensate water from an air conditioner, refrigeration or heat pump system and any needed make-up water in a passive, capillary effect method coupled with the use of outdoor air for evaporatively subcooling the liquid refrigerant that has passed through the condenser of said air conditioner, refrigeration or heat pump system and then the air exhausting from the first heat exchanger subsequently passed through a second heat exchanger for precooling the hot gas discharge refrigerant from a compressor before said refrigerant passes into the condenser of said air conditioner, refrigeration or heat pump system comprising in combination:

a) the first heat exchanger, a subcooler serially connected in fluid communication with the output of the condenser and the input to the evaporator, enabling the refrigerant to flow through said subcooler, then to the evaporator after first flowing through the condenser;

b) a second heat exchanger, a precooler serially connected in fluid communication with the output of a compressor and then to the condenser, enabling the hot gas refrigerant discharge from a compressor to flow through said precooler before passing into the condenser;

c) the bottom of said subcooler placed in a first water storage reservoir that receives the discharge of condensate water from said air conditioner, refrigeration or heat pump system and make-up water for a capillary feed of said water into a first heat exchanger (a subcooler) for purposes of evaporative cooling by means of the outdoor air passing over the wetted surfaces of said subcool heat exchanger;

d) a means for said water to pass from the first water storage reservoir into a second water storage reservoir where a second heat exchanger (the precooler) is wetted by capillary action;

e) said precooler is connected in fluid communication with the air flow output of the subcool heat exchanger where the previously used outdoor air passes through the condensate and make-up water wetted precooler heat exchanger where said outdoor air cools by evaporating the wet surface of said precooler which in turn precools the hot gas refrigerant passing through the precooler; and f) a means for said condensate and make-up water to overflow to discharge whereby said subcool and precool system utilizes said evaporative cooling for providing maximum available subcooling to the liquid refrigerant and maximum available precooling to the hot gas discharge refrigerant of said air conditioner, refrigeration or heat pump system.

15. A combination subcool and precool heat exchanger system that utilizes the stored condensate water from an air conditioner, refrigeration or heat pump system and any needed make-up water coupled with the use of the cold, dry building exhaust air for first evaporatively subcooling the liquid refrigerant that flows out of the condenser of said air conditioner, refrigeration or heat pump system and then using only the air exiting the subcooler to conductively cool a second dry heat exchanger (the precooler), for precooling the hot gas discharge refrigerant from a compressor before said refrigerant passes into the condenser of said air conditioner, refrigeration or heat pump system comprising in combination:

a) the first heat exchanger, a subcooler serially connected in fluid communication between the output of the condenser and the input to the evaporator, enabling the refrigerant to flow through said subcooler, after first flowing through the condenser, and before flowing into the evaporator;

b) a second heat exchanger, a precooler serially connected in fluid communication between the output of a compressor and the inlet to the condenser, enabling the hot gas refrigerant to flow from the compressor then through said precooler and finally into the condenser;

c) said subcooler placed in a water storage reservoir that receives the discharge of condensate water from said air conditioner, refrigeration or heat pump system and any needed make-up water where said water wets the surface of said subcooler and where said surface is cooled evaporatively by means of the cold, dry building exhaust air passing over the wetted surface of said subcool heat exchanger;

d) a means for excess of said condensate and make-up water to overflow to drainage; and e) said precooler is connected in fluid communication with the air flow output of the subcool heat exchanger where the previously used cold, dry building exhaust air discharging from the evaporatively cooled subcooler passes through a non-wetted surface precooler for conductively cooling the hot gas refrigerant passing through the precool heat exchanger, whereby said subcool and precool system utilizes said available subcooling to the liquid refrigerant and maximum available precooling to the hot gas discharge refrigerant of said air conditioner, refrigeration or heat pump system.

16. A combination subcool and precool heat exchanger system that utilizes the stored condensate water from an air conditioner, refrigeration or heat pump system and any needed make-up water coupled with the use of outdoor air for first evaporatively subcooling the liquid refrigerant that flows out of the condenser of said air conditioner, refrigeration or heat pump system and then using only the air exiting the subcooler to conductively cool a second dry heat exchanger (the precooler), for precooling the hot gas discharge refrigerant from a compressor before said refrigerant passes into the condenser of said air conditioner, refrigeration or heat pump system comprising in combination:

a) the first heat exchanger, a subcooler serially connected in fluid communication between the output of the condenser and the input to the evaporator, enabling the refrigerant to flow through said subcooler, after first flowing through the condenser, and before flowing into the evaporator;

b) a second heat exchanger, a precooler serially connected in fluid communication between the output of a compressor and the inlet to the condenser, enabling the hot gas refrigerant to flow from the compressor then through said precooler and finally into the condenser;

c) said subcooler placed in a first water storage reservoir that receives the discharge of condensate water from said air conditioner, refrigeration or heat pump system and any needed make-up water where said water wets the surface of said subcooler and where said surface is cooled evaporatively by means of outdoor air passing over the wetted surface of said subcool heat exchanger;

d) a means for excess of said condensate and make-up water to overflow to drainage; and e) said precooler is connected in fluid communication with the air flow output of the subcool heat exchanger where the previously used outdoor air discharging from the evaporatively cooled subcooler passes through a non-wetted surface precooler for conductively cooling the hot gas refrigerant passing through the precool heat exchanger, whereby said subcool and precool system utilizes said available subcooling to the liquid refrigerant and maximum available precooling to the hot gas discharge refrigerant of said air conditioner, refrigeration or heat pump system.

17. A heat exchange refrigerant postheat system that utilizes relatively warm building exhaust air for adding extra heat to the evaporator side of a heat pump system comprising in combination:

a) a postheater serially connected in fluid communication with the output of a heat pump, operating in the heating mode, evaporator and the input to the compressor, enabling the hot gas refrigerant discharge from the evaporator to flow through said postheater before passing into the compressor;

b) said postheater further connected in fluid communication with the relatively warm building exhaust air that subsequently warms the refrigerant passing through said postheater, whereby said postheater utilizes the relatively warm building exhaust air to provide maximum postheating of the refrigerant of said heat pump system operating in the heating mode.

18. A combination subcool and postheat heat exchanger system that utilizes building exhaust air to first subcool the liquid refrigerant that flows out of the condenser of a heat pump system operating in the heating mode and then reuses the subcooler warmed (building exhaust)air to add heat to the refrigerant passing through the postheat heat exchanger from the primary evaporator to the compressor of said heat pump system comprising in combination:

a) the first heat exchanger, a subcooler serially connected in fluid communication with the output of the condenser and the input to the evaporator, enabling the refrigerant to flow through said subcooler, then to the evaporator after first flowing through the condenser;

b) a second heat exchanger, a postheater serially connected in fluid communication with the output of an evaporator and the input of the compressor, enabling the refrigerant to flow through said postheater, then to the compressor after first flowing through the evaporator;

c) said subcooler connected in fluid communication with relatively cool building exhaust air that subsequently cools by conduction the subcooler which in turn cools the liquid refrigerant flowing through the subcooler and which in turn warms the air passing through the subcooler;

d) said postheater connected in serial communication with the airflow output of the subcooler of the previously used and subsequently warmed building exhaust air where said relatively warm air supply finishes evaporating and warming the refrigerant flowing through the postheater whereby said subcool and postheat system utilizes the building exhaust air for providing maximum available subcooling to the liquid refrigerant and maximum available postheating to the refrigerant passing through said postheater of said heat pump system operating in the heating mode.

19. A combination subcool and postheat heat exchanger system that utilizes outdoor air to first subcool the liquid refrigerant that flows out of the condenser of a heat pump system operating in the heating mode and then reuses the subcooler warmed air to add heat to the refrigerant passing through the postheat heat exchanger from the primary evaporator to the compressor of said heat pump system comprising in combination:

a) the first heat exchanger, a subcooler serially connected in fluid communication with the output of the condenser and the input to the evaporator, enabling the refrigerant to flow through said subcooler, then to the evaporator after first flowing through the condenser;

b) a second heat exchanger, a postheater serially connected in fluid communication with the output of an evaporator and the input of the compressor, enabling the refrigerant to flow through said postheater, then to the compressor after first flowing through the evaporator;

c) said subcooler connected in fluid communication with cold outdoor air that subsequently cools by conduction the subcooler which in turn cools the liquid refrigerant flowing through the subcooler and which in turn warms the air passing through the subcooler;

d) said postheater connected in serial communication with the airflow output of the subcooler of the previously used and subsequently warmed cold outdoor air where said relatively warm air supply finishes evaporating and warming the refrigerant flowing through the postheater whereby said subcool and postheat system utilizes the outdoor air for providing maximum available subcooling to the liquid refrigerant and maximum available postheating to the refrigerant passing through said postheater of said heat pump system operating in the heating mode.

20. A heat exchange refrigerant subcool system that utilizes relatively cold, building exhaust air passing over a subcooler to conductively subcool a liquid refrigerant that has already passed through the condenser of said air conditioner, refrigeration or heat pump system comprising in combination:

a) a subcooler serially connected in fluid communication with the output of the condenser and input to the evaporator, enabling the refrigerant to flow through said subcooler after first flowing through the condenser; and b) said subcooler connected in fluid communication with the relatively cold building exhaust air that subsequently cools by conduction the subcooler which in turn cools the liquid refrigerant in the subcooler, whereby said subcooler utilizes said conductive cooling process for providing maximum available subcooling to the liquid refrigerant of an air conditioner, refrigeration or heat pump system.

21. A heat exchange refrigerant precool system that utilizes relatively cold building exhaust air by passing said building exhaust air over said precool heat exchanger for conductively precooling a hot gas refrigerant before said hot gas refrigerant passes into the condenser of said air conditioner, refrigeration or heat pump system, comprising in combination:

a) a precooler serially connected in fluid communication with the output of a compressor and the input of a condenser, enabling the hot gas refrigerant to flow through said precooler before passing into the condenser;

b) said precooler further connected in fluid communication with relatively cold building exhaust air that subsequently cools by conduction the precooler which in turn precools the refrigerant flowing through said precooler.

22. A combination subcool and precool heat exchanger system that utilizes relatively cold building exhaust air for first conductively subcooling the liquid refrigerant that has passed through the condenser of said air conditioner, refrigeration or heat pump system and then the air exhausting from the first heat exchanger subsequently passing through a second heat exchanger for conductively precooling the hot gas discharge refrigerant from a compressor before said refrigerant passes into the condenser of said air conditioner, refrigeration or heat pump system comprising in combination:

a) the first heat exchanger, a subcooler serially connected in fluid communication between the output of the condenser and the input to the evaporator, enabling the refrigerant to flow through said subcooler, then to the evaporator, after first flowing through the condenser;

b) a second heat exchanger, a precooler serially connected in fluid communication between the output of a compressor and then to the condenser, enabling the hot gas refrigerant discharge from a compressor to flow through said precooler before passing into the condenser;

c) said subcooler placed in an enclosed duct system that receives the discharge of cold building exhaust air so that said air supply passes through the first heat exchanger (a subcooler) for purposes of conductively cooling by means of the cold building exhaust air passing over the surfaces of said subcool heat exchanger;

d) said precooler connected in fluid communication with the air flow output of the subcool heat exchanger where the previously used cold building exhaust air passes through the precooler heat exchanger where said cold building exhaust air cools by conduction the surface of said precooler which in turn precools the hot gas refrigerant passing through the precooler.

23. A method for evaporative cooling of an incoming air supply including outdoor air or exhaust building air with condensate water or make-up water, comprising at least one of the steps of:

(a) using evaporatively cooled air to subcool the liquid refrigerant passing through an air to refrigerant heat exchanger after the liquid refrigerant has exited a primary condensing heat exchanger, or;

(b) reusing the evaporatively cooled air after exiting a subcooler heat exchanger to precool the refrigerant hot gas in an air to refrigerant heat exchanger after the hot gas refrigerant exits the compressor but before the hot gas refrigerant enters the primary condensing heat exchanger.

24. A method for evaporatively cooling of incoming air supply including outdoor air or exhaust building air with condensate water or make-up water, comprising at least one of the steps of:

(a) passing evaporatively cooled air across a wetted subcooler heat exchanger, or;

(b) reusing air exiting a subcooler heat exchanger by subsequently passing said reused air across a wetted precooler heat exchanger.

25. A method for evaporatively cooling of incoming air supply including outdoor air or exhaust building air with condensate water or make-up water while simultaneously evaporatively cooling said water supply, comprising at least one of the steps of:

(a) reusing the evaporatively cooled air after exiting the subcooler heat exchanger to precool the refrigerant hot gas in an air to refrigerant heat exchanger after the hot gas refrigerant exits the compressor but before the refrigerant gas enters the primary condensing heat exchanger, or;

(b) evaporatively cooling the air exiting the subcooler heat exchanger then using this two-stage eveporatively cooled air to precool the refrigerant hot gas in an air to refrigerant heat exchanger after the hot gas refrigerant exits the compressor or before the refrigerant gas enters the primary condensing heat exchanger, or;

(c) reusing air exiting subcooler heat exchanger by subsequently passing said air across a wetted precooler heat exchanger.

* * * * *